April 27, 1943.                G. E. DEY                 2,317,592
                          HANDLE ASSEMBLY
                         Filed Aug. 8, 1941
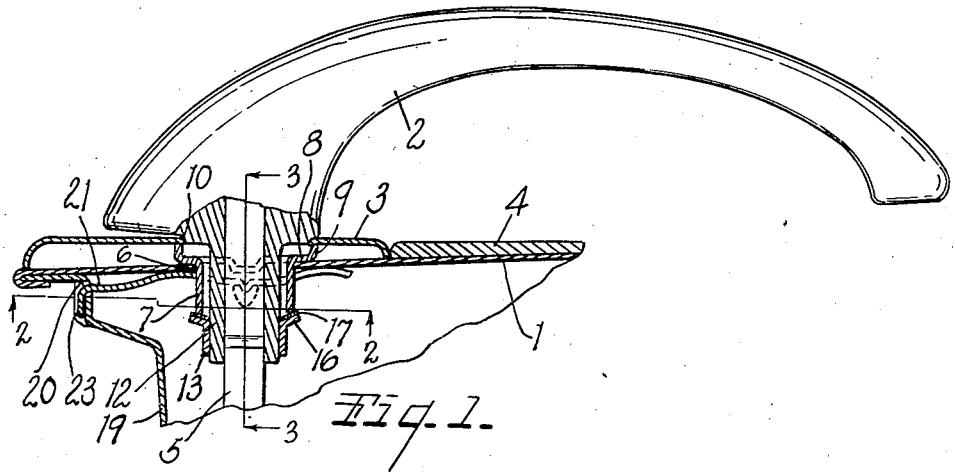
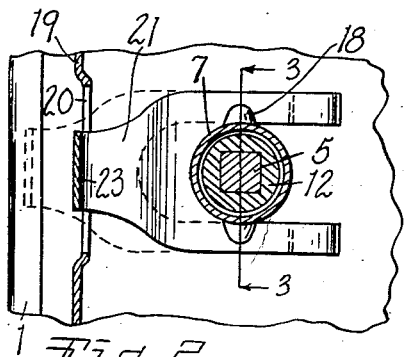
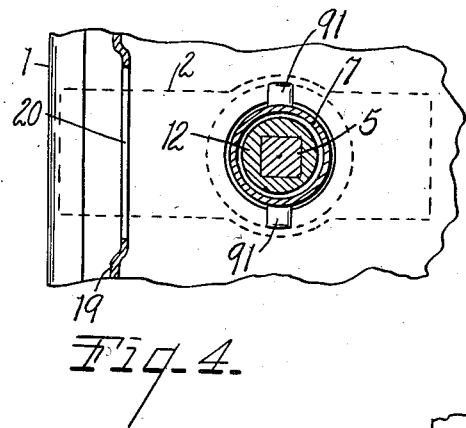
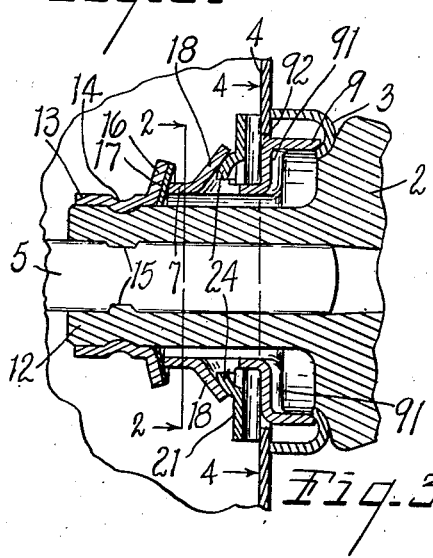
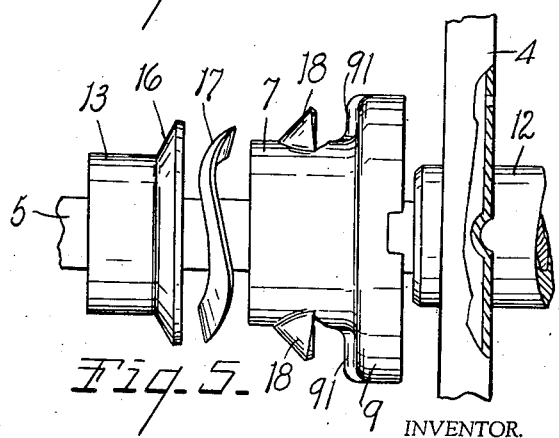
INVENTOR.
GEORGE E. DEY
BY Earl T. Chappell
ATTORNEY.

Patented Apr. 27, 1943

2,317,592

UNITED STATES PATENT OFFICE 2,317,592

HANDLE ASSEMBLY

George E. Dey, Grand Rapids, Mich., assignor to W. B. Jarvis Company, Grand Rapids, Mich.

Application August 8, 1941, Serial No. 405,907

4 Claims. (Cl. 292—352)

This invention relates to improvements in handle assemblies.

The main objects of this invention are:

First, to provide a handle assembly which is highly desirable for automobile doors and also one which is characterized primarily by the ease and expedition with which the parts are associated with one another and assembled in operative relation to a door or door panel.

Second, to provide a handle and escutcheon assembly in which all of the parts thereof including the escutcheon and escutcheon securing elements may be preliminarily assembled in a compact unitary structure prior to completing the assembly on an automobile door or panel thereof.

Third, to provide an assembly of the type described which greatly decreases the time and difficulty of installing the same on a door or other device.

Fourth, to provide an assembly wherein the parts are all simple and inexpensive, though rugged and distortion-resistant in operation.

Further objects relating to details and economies of my invention will appear from the description to follow. The invention is defined in the claims.

A structure embodying the features of my invention is illustrated in the accompanying drawing, wherein:

Fig. 1 is a fragmentary view partially broken away and in section illustrating a handle and escutcheon assembly in accordance with my invention in operative installed position on an automobile door panel.

Fig. 2 is a fragmentary view in section on line 2—2 of Figs. 1 and 3 illustrating details of the locking structure of the present assembly.

Fig. 3 is an enlarged fragmentary view in section on line 3—3 of Figs. 1 and 2, further illustrating details of construction and arrangement of the elements of the assembly.

Fig. 4 is a fragmentary view in section on line 4—4 of Fig. 3.

Fig. 5 is an enlarged side elevation view illustrating various parts of the assembly of my invention in exploded relation to clarify the construction thereof.

The present invention relates to a handle and escutcheon assembly primarily characterized by the fact that most of the component parts thereof may be brought together into a preassembled unitary form prior to installation thereof on a door such for example as an automobile door. The principal features of the invention may be applied to any operating instrumentality of a character generally similar to a handle. A further feature of the invention resides in the fact that in such preliminarily assembled relation the parts may be very easily and quickly installed on the door or other structure receiving the same and effectively locked in position thereon. So installed, a certain amount of play is present, if desired, for facilitating the alinement of a spindle carried by the handle with a spindle actuated mechanism associated with the door.

Referring to the drawing, the reference numeral 1 indicates a door panel for an automobile door or other surface with which it is desired to associate the handle assembly of my invention. This assembly includes a handle 2, an ornamental escutcheon 3, which if desired may be alined with and designed so as to complement or blend into an ornamental molding 4 exteriorly of the panel, and a spindle 5 attached to the handle in a manner to be described and engageable with door latch operating or other instrumentalities disposed interiorly of the door. These parts are maintained in operative relation by other elements of the assembly to be hereinafter described.

The door panel 1 is provided with an opening 6 for the reception of a generally cylindrical sleeve-like escutcheon mounting and support member 7, which member is enlarged at its outer end to provide an annular radial shoulder 8 abuttingly engageable with the panel and an annular axially extending flange 9 for supportingly engaging the escutcheon adjacent the handle-receiving opening 10 in the latter. As illustrated in Figs. 1 and 3 the said annular shoulder is depressed or embossed axially at diametrically opposed points indicated by the reference numeral 91 to provide lugs which in operative position extend into special side locating recesses 92 provided in the door panel opening 6 to receive the same, and thereby prevent rotation of the sleeve-like member 7 relative to the panel.

The base of the handle 2 is rotatably receivable in said escutcheon opening and has a hollow elongated shank or axial extension 12 axially receivable in the sleeve-like member 7 with substantial lateral clearance on all sides.

Inwardly of the said sleeve-like member 7 a flanged collar 13 is sleeved on the handle extension 12 and secured by means of indentations 14 formed or peened in this collar and the shank 12. The collar and extension are rigidly secured to the spindle 5 to prevent relative endwise movement of the collar, handle extension and spindle. The spindle has a side recess or depression therein to permit the upsetting of the metal effecting this locking of the parts as shown in Fig. 3. The hollow interior of the handle section is preferably non-circular in section and the spindle similarly formed to prevent relative rotation (see Fig. 2).

Interposed axially between the flange 16 of the collar 13 and the inner end of the sleeve member 7 is an annular spring washer or member 17 of wavy configuration which is compressed when the parts are in the operative installed position of Figs. 1 and 3 to prevent rattling.

The foregoing parts are assembled in the manner described prior to installing the same on the panel, that is, the escutcheon 3 is first telescoped over the handle shank and disposed against the base of the handle. Sleeve-like member 7 is next telescoped on the shank and abutted against the escutcheon concentric with the opening therein. Then annular spring 17 and the collar 13 are slipped over the shank and urged axially to compress the spring member, in which condition spindle 5 is inserted interiorly of the handle shank and the parts upset or peened as described to lock the same into the preliminarily assembled condition thereof. In this condition it is only necessary to insert the assembly into the panel opening, registering the coacting projections 91 and the panel opening side or locating recesses 92, and lock the assembly in place to complete the installation. The locking steps will now be described.

It will be noted, referring to Figs. 2 and 3, that the body of the tubular sleeve-like member 7 is provided with a pair of opposite struck-out projections or ears 18 of concave section in spaced relation to the shoulder 8 of the member. Likewise it will be noted that the inner side 19 of the door which is associated with the panel 1 and coacts with a suitable jamb is provided with a slot 20 through which extends a forked spring assembly locking member or key 21, see Figs. 1 and 2. This locking key is formed of blade spring steel and the legs of the fork thereof are bowed and adapted to straddle the sleeve-like member 7, as illustrated in Figs. 1, 2 and 3. The key is insertable through the slot 20 from the dotted line position illustrated in Fig. 2 to solid line position of that figure, the outer end 23 of the locking member being offset at an angle to provide a head to limit the inward shifting thereof.

Referring to Figs. 1 and 3, it will be noted that the locking key has a curved, sinuous or wavy configuration for resiliency, whereby in the operative locking position thereof illustrated in those figures it is compressed axially by engaging the interior of panel 1 and the projecting ears 18 on member 7. Thus it tends to urge the latter axially inwardly, maintaining the handle base against the escutcheon, the escutcheon against the door panel, and the locating and anchoring projections 91 in proper position in the recesses 92 receiving the same. These results are had because the member 7 transmits axial thrust to the spring 17, collar 13, and handle extension 12, so that the entire handle assembly is resiliently biased inwardly towards the door panel. Yet there is a certain amount of lost motion due to the resilient locking key and the side clearance adjacent the handle extension which will enable swiveling of the handle extension within the body of sleeve 7 so as to permit spindle 5 to be properly alined with an instrumentality with which it is to coact interiorly of the door.

Referring to Fig. 3, it will be noted that the legs of the forked locking key 21 are each provided with an inwardly upset detent or dog 24 for coaction with the concave ears 18 on member 7 when the locking member is in fully inserted or actuated position, thereby restraining inadvertent outward displacement of the key.

From the foregoing it will be apparent how the assembly of the invention facilitates the installation of a handle or other operating device on a panel or equivalent member. Not only may the parts be preliminarily assembled prior to installation and thereby prevent loss or mislaying of the same, the entire preliminary assembly including escutcheon, handle, spindle, and handle mounting elements maybe associated at once with the door panel without requiring a plurality of separate time-consuming assembling operations. Following this, it is only necessary to insert and push or drive home the locking key 21 to secure the parts firmly in place with, however, a slight desirable play or lost motion. Should it be desired to remove and disassemble the handle, this may be done by simply prying out the locking key 21.

The invention has been illustrated and described in an embodiment which is very practical. No attempt has been made to illustrate or describe other embodiments of which the invention is capable as it is believed this disclosure will enable the adaptation of the invention as may be desired.

Having thus described the invention what is claimed as new and desired to secure by Letters Patent is:

1. A locking assembly for a handle and escutcheon adapting the same to be readily assembled on a door or other structure, the handle having a shank and the escutcheon being telescoped thereon and engageable with an outer door panel, said assembly comprising a tubular mounting member adapted to be telescoped on the handle shank in axial thrust transmitting relation to said escutcheon with substantial lateral clearance between the shank and member, a collar telescoped on the handle shank in axial thrust engagement with said member with an anti-rattle spring interposed, said collar being rigidly secured to the handle to prevent axial separation from the handle of the parts telescoped thereon, said mounting member having a shoulder for axial thrust engagement with said panel, and a resilient forked locking key operatively insertable from the exterior of the door normal to the axis of said telescoped parts, said key straddling said mounting member and having spring engagement at its sides with said panel and mounting member to thrust the latter axially inwardly relative to the panel, said key being longitudinally sinuous in outline for resiliency and compressibility between the panel and mounting member, said mounting member having a projection engageable by said locking member for effecting said axial thrust transmitting connection between the locking and mounting members and said key having a detent engageable with said projection to resist displacement of the key from operative position.

2. A locking assembly for a handle and escutcheon adapting the same to be readily assembled on a door or other structure, the handle having the escutcheon abuttingly received thereon and engageable with an outer door panel, said assembly comprising a tubular mounting member adapted to be telescoped on the handle in axial thrust transmitting relation to said escutcheon with substantial lateral clearance between the shank and member, means on the handle in axial thrust engagement with said member to prevent axial separation from the handle of the parts telescoped thereon, said mounting member having axial thrust engagement with said panel, and a resilient forked locking key operatively insertable from the exterior of the door normal to the axis of said telescoped parts, said key straddling said mounting member and having spring engagement at its sides with said panel and mounting member to thrust the latter axially inwardly relative to the panel, said key being longitudinally sinuous in outline for resiliency and compressibility between the panel and mounting member, said mounting member having a projection engageable by said locking member for effecting said axial thrust transmitting connection between the locking and mounting members and said key having a detent engageable with said projection to resist displacement of the key from operative position.

3. In a handle and escutcheon securing assembly for a handle provided with a shank, a sleeve shouldered for engagement with a door panel and adapted to embrace said shank and constituting a thrust supporting member for the escutcheon, a thrust collar adapted to be secured to said shank in supporting relation to said sleeve, said sleeve being provided with panel engaging positioning lugs and with outwardly facing recessed locking key lugs, and a spring locking key forked to embrace said sleeve and adapted to be inserted on the inside of a door panel and having detents in the arms thereof having snap engagement with said recessed lugs, the legs of said forked key being substantially parallel and longitudinally sinuous in outline for resiliency under compression between the panel and lugs.

4. A securing assembly for a handle provided with a shank, comprising a sleeve shouldered for engagement with a door panel and embracing said shank, a thrust collar secured to said shank in supporting relation to said sleeve, said sleeve being provided with panel engaging positioning lugs and with locking key lugs, and a spring locking key forked to embrace said sleeve and adapted to be inserted on the inside of a door panel and having detents in the arms thereof having snap engagement with said lugs, the legs of said forked key being substantially parallel and longitudinally sinuous in outline for resiliency under compression between the panel and lugs.

GEORGE E. DEY.